US008700269B2

(12) United States Patent
Hubalek

(10) Patent No.: US 8,700,269 B2
(45) Date of Patent: Apr. 15, 2014

(54) STEERABLE AGRICULTURAL IMPLEMENT WITH MULTI-POINT HITCH

(75) Inventor: Verne Hubalek, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 378 days.

(21) Appl. No.: 13/043,186

(22) Filed: Mar. 8, 2011

(65) Prior Publication Data
US 2012/0232760 A1 Sep. 13, 2012

(51) Int. Cl.
G06F 7/70 (2006.01)
G06F 19/00 (2011.01)
G06G 7/00 (2006.01)
G06G 7/76 (2006.01)

(52) U.S. Cl.
USPC ............. 701/50; 701/41; 701/42; 280/426; 280/5.51; 280/419; 172/115; 172/279; 172/280

(58) Field of Classification Search
USPC ............. 701/36, 41, 42, 50; 280/204, 423.1, 280/426, 442, 5.51, 419; 172/115, 279, 172/280, 282; 37/234
See application file for complete search history.

(56) References Cited

U.S. PATENT DOCUMENTS

| 7,225,068 | B2 * | 5/2007 | Schick et al. | 701/41 |
| 2006/0142936 | A1 * | 6/2006 | Dix | 701/200 |
| 2009/0272551 | A1 * | 11/2009 | Thompson et al. | 172/284 |
| 2009/0276127 | A1 * | 11/2009 | Dix | 701/50 |
| 2011/0125371 | A1 * | 5/2011 | Wang et al. | 701/42 |
| 2012/0185139 | A1 * | 7/2012 | Prickel et al. | 701/50 |
| 2012/0240546 | A1 * | 9/2012 | Kormann | 56/344 |

OTHER PUBLICATIONS

Pre-Delivery Manual 3PYPA; 3-Point 40ft Yield-Pro® Planter with Air-Pro™ Seed Meters; Great Plains Manufacturing, Inc.; Operator's Manual; Feb. 18, 2010; Salina, KS.

* cited by examiner

Primary Examiner — Rami Khatib
(74) Attorney, Agent, or Firm — Hovey Williams LLP

(57) ABSTRACT

A steerable agricultural implement configured to be coupled to a tractor by a multi-point hitch system that restrains side-to-side articulation between the tractor and the implement. The agricultural implement includes a steering controller that receives a positional attribute from a steering system of the tractor and controls a degree of pivot of a wheel assembly of the agricultural implement based on the positional attribute of the tractor steering system. The wheel assembly is configured with a steering actuator that is operable to pivot a portion of the wheel assembly without transmitting force beyond the wheel assembly, abutment stops to define maximum degrees of pivot of the portion of the wheel assembly and relieve the steering actuator without transmitting force beyond the wheel assembly, and a quick release free-wheel mechanism to enable a disconnected or "free wheel" operation of the wheel assembly independent of the steering actuator.

16 Claims, 11 Drawing Sheets

STEERABLE AGRICULTURAL IMPLEMENT WITH MULTI-POINT HITCH

BACKGROUND

1. Field of the Invention

The present inventive concept relates generally to a steerable implement that is reactive to a steerable vehicle. More specifically, embodiments of the present inventive concept concern a steerable implement equipped with a multi-point hitch and crop-sowing tools, the steerable implement being particularly suitable for use with a tractor in an agricultural environment.

2. Description of the Related Art

Crops are cultivated throughout the world in a wide variety of fields of varying sizes. It is desirable in many of these fields to sow crops via a maneuverable, mounted planter that is connected to a tractor via a multi-point hitch, for example, a three-point hitch.

Conventional three-point planters include row units that are evenly spaced adjacent to each other and along a width of the planter. Each row unit is operable to distribute seed along a row in a field. For some large three-point planters, the seed is delivered from a bulk seed hopper mounted on the planter. The bulk seed hopper is centrally mounted toward a rear of the planter and supported in part by two caster wheels positioned generally below the bulk-seed planter.

To achieve optimum planting efficiency, it is generally desirable to provide a planter with a bulk seed hopper of a maximum capacity to enable transportation of a maximum amount of seed and a maximum number of row units. However, larger bulk seed hoppers and more row units decrease maneuverability and increase weight, which are problematic in fields lacking sufficient turnaround areas and/or with soft soil conditions. The decreased maneuverability and increased weight are particularly problematic when attempting to reverse conventional planters for at least the reason that, should it be desirable to travel in reverse, the caster wheels of conventional planters must spin around completely which creates unwanted divots or gouges in the field; a problem that is aggravated as the weight of the bulk seed hopper is increased.

Accordingly, it would be desirable to have a large multi-point planter exhibiting enhanced maneuverability and minimal soil disturbance during tight maneuvering.

SUMMARY

The present inventive concept provides a steerable agricultural implement configured to be coupled to a tractor by a multi-point hitch system that restrains side-to-side articulation between the tractor and the implement. The steerable agricultural implement includes a control system that receives a positional attribute from a steering system of the tractor and, based on the positional attribute of the tractor steering system, controls a degree of pivot of a steerable wheel assembly of the agricultural implement.

When the tractor pulling the steerable implement is equipped with a controller area network data binary unit system (CAN bus), the positional attribute of the tractor steering system can be read/received directly from the CAN bus. Alternatively, the positional attribute of the tractor steering system can be detected using one or more steering position sensors operably connected to the steering system of the tractor. Accordingly, the steerable agricultural implement described herein can be configured for use with either a tracked tractor or a wheeled tractor.

The steerable wheel assembly of the agricultural implement can be equipped with (i) a steering actuator that is operable to pivot the wheel assembly without transmitting force beyond the wheel assembly, (ii) adjustable abutment stops to define maximum degrees of pivot of the wheel assembly and relieve the steering actuator without transmitting force beyond the wheel assembly, and/or (iii) a quick release free-wheel mechanism to enable a disconnected or "free wheel" operation of the wheel assembly independent of the steering actuator.

One or more of the above features, advantageously ensures proper pivoting of the implement's wheels during forward and/or reverse travel of the implement without requiring the implement's wheels to spin around, thus preventing formation of unwanted divots or gouges in a field.

BRIEF DESCRIPTION OF THE DRAWINGS

Embodiments of the present inventive concept are described herein with reference to the following drawing figures, wherein.

DETAILED DESCRIPTION

Figure 1:
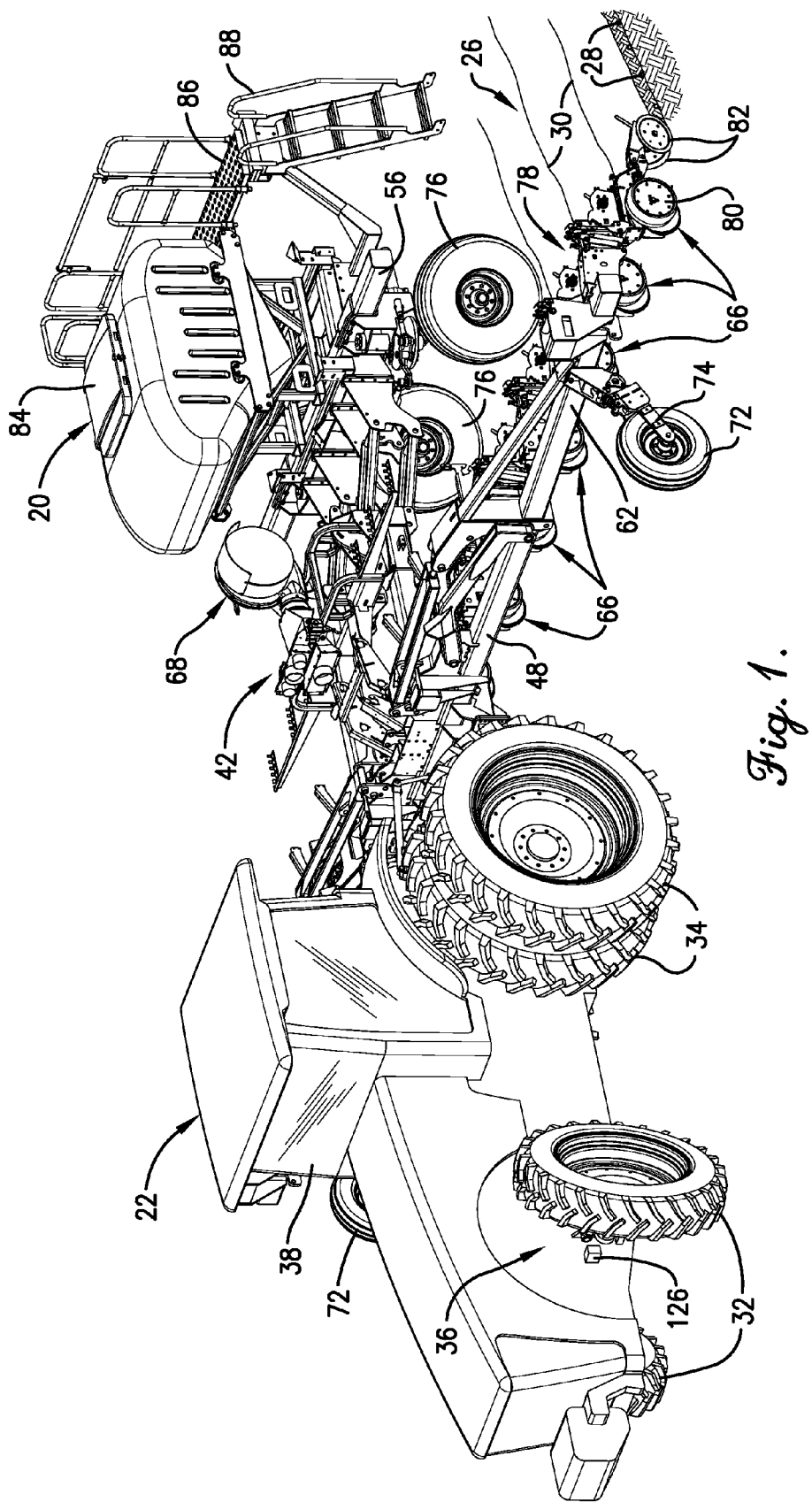
FIG. 1 is a front left side perspective view of a implement-tractor combination configured in accordance with an exemplary embodiment of the present inventive concept.

The present inventive concept is susceptible of embodiment in many forms. While the drawings illustrate, and the specification describes, certain embodiments of the invention, it is to be understood that such disclosure is by way of example only. The principles of the present inventive concept are not limited to the particular disclosed embodiments.

With initial reference to FIGS. 1-4, a steerable agricultural implement 20 is generally illustrated in an exemplary embodiment and is configured to be coupled to a steerable vehicle, such as tractor 22, for use in an agricultural environment. The implement-tractor combination 20, 22 is operable to traverse a field 26 while delivering seed 28 to rows 30 formed therein. Although the exemplary embodiment utilizes a steerable vehicle in the form of the tractor 22, it is foreseen that the steerable agricultural implement 20 may be utilized with any steerable vehicle and in any application and environment without deviating from the scope of the present inventive concept.

Figure 10:
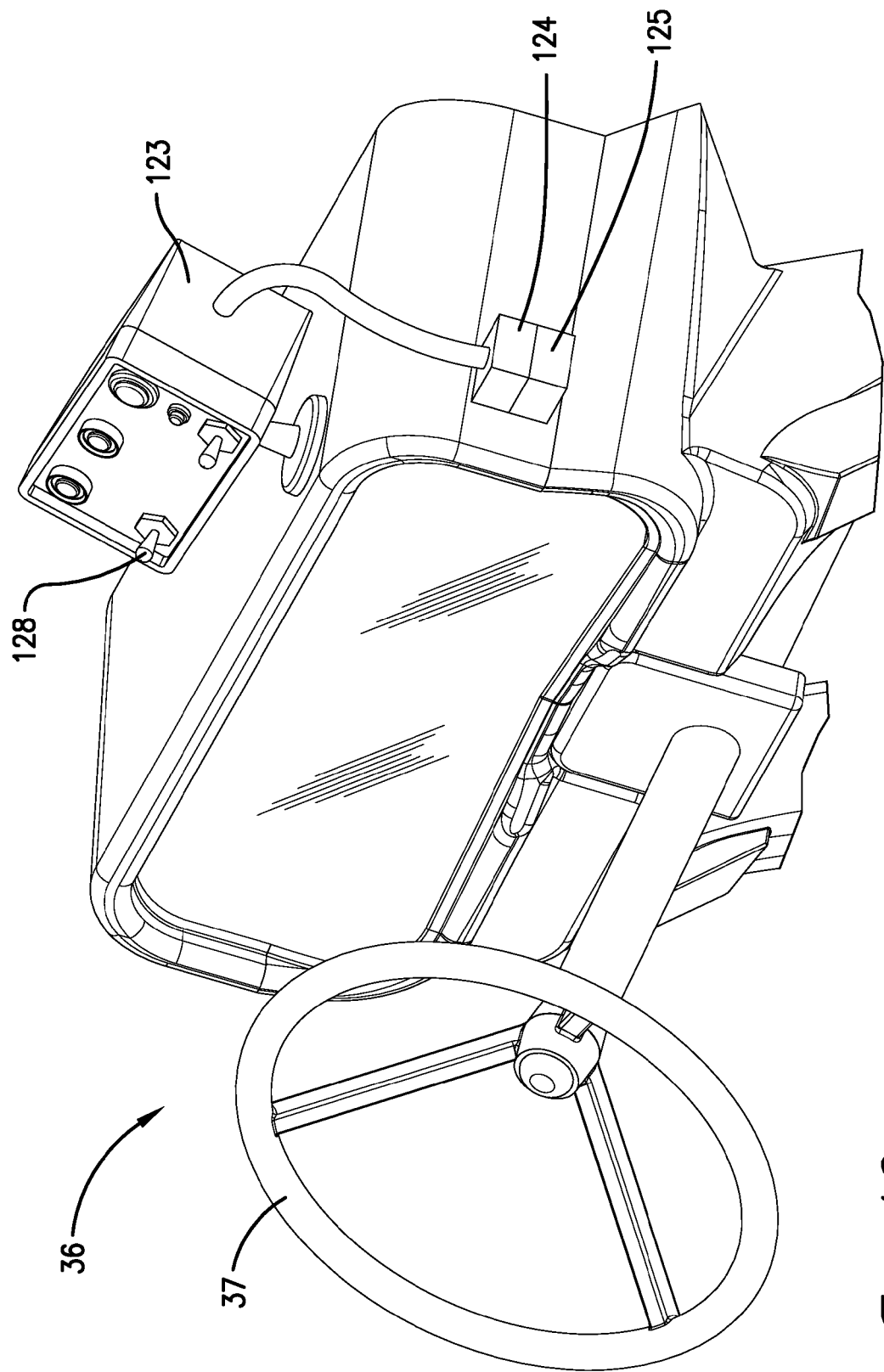
FIG. 10 is a rear right side perspective view depicting an in-cab portion of a steering system of the implement-tractor combination illustrated in FIG. 1.

The tractor 22 includes a set of steerable front wheels 32 and a set of fixed rear wheels 34. The front wheels 32 are operable to be controlled by a front-wheel tractor steering system 36 that includes controls, such as steering wheel 37, that are at least partially located in a cab 38 of the tractor 22, as illustrated by FIG. 10.

The tractor 22 is connected to the implement 20 via a hitch 40 that extends from a rear of the tractor 22, engages a front of the implement 20. In the preferred embodiment, the hitch 40 is a multi-point hitch 40, for example, a two-point hitch or three-point hitch, that substantially prevents horizontal pivoting or side-to-side articulation between the tractor 22 and the implement 20, and is operable to raise and lower a portion of the implement 20, a function that is discussed in further detail hereafter. Additionally, the hitch 40 supports a portion of the weight of the implement 20 to provide the implement 20 with a degree of floatation. It is foreseen that the hitch 40 may be any hitch that is operable to secure the implement 20 to the tractor 22 without deviating from the scope of the present inventive concept.

Figure 2:
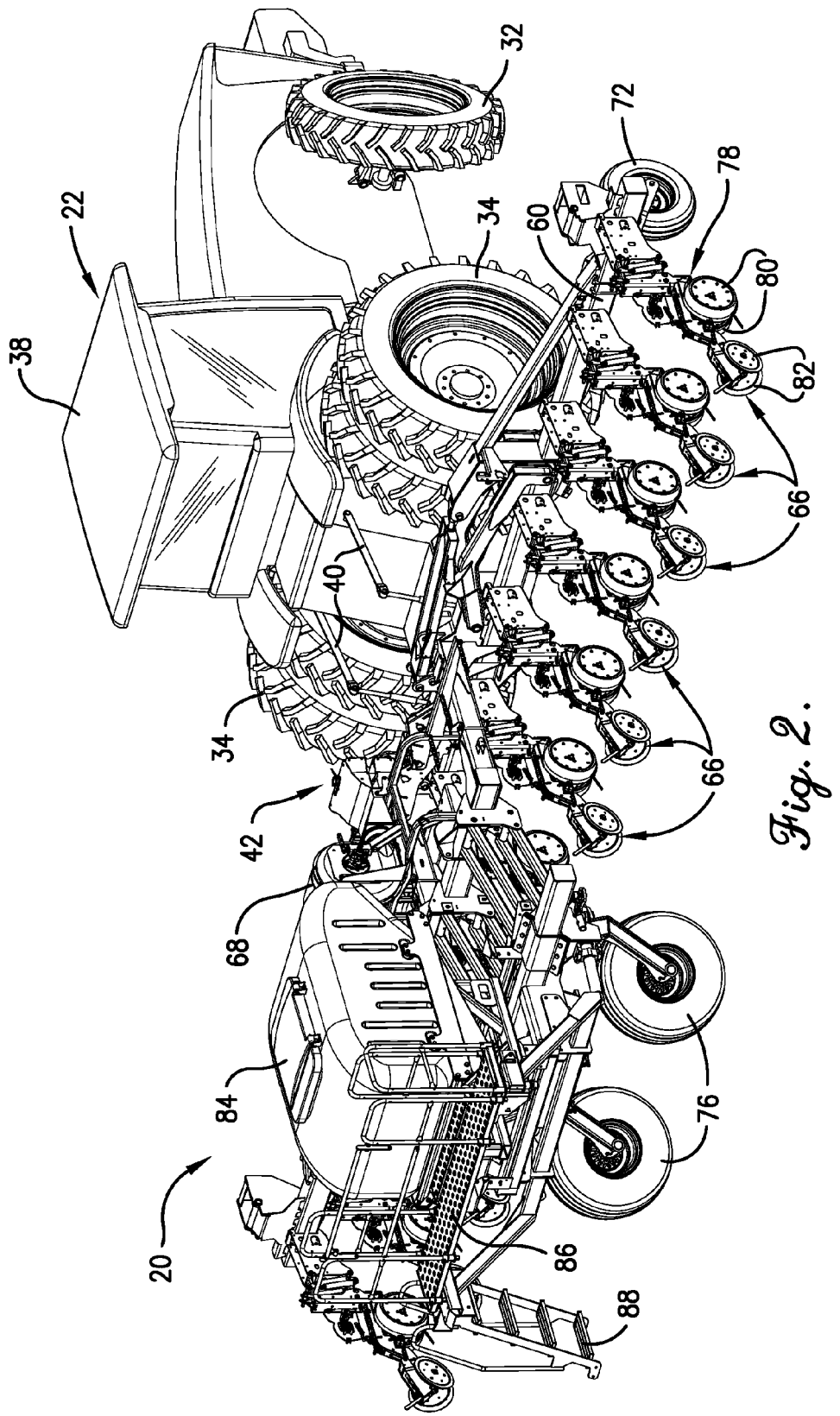
FIG. 2 is a rear right side perspective view of the implement-tractor combination illustrated in FIG. 1.
Figure 3:
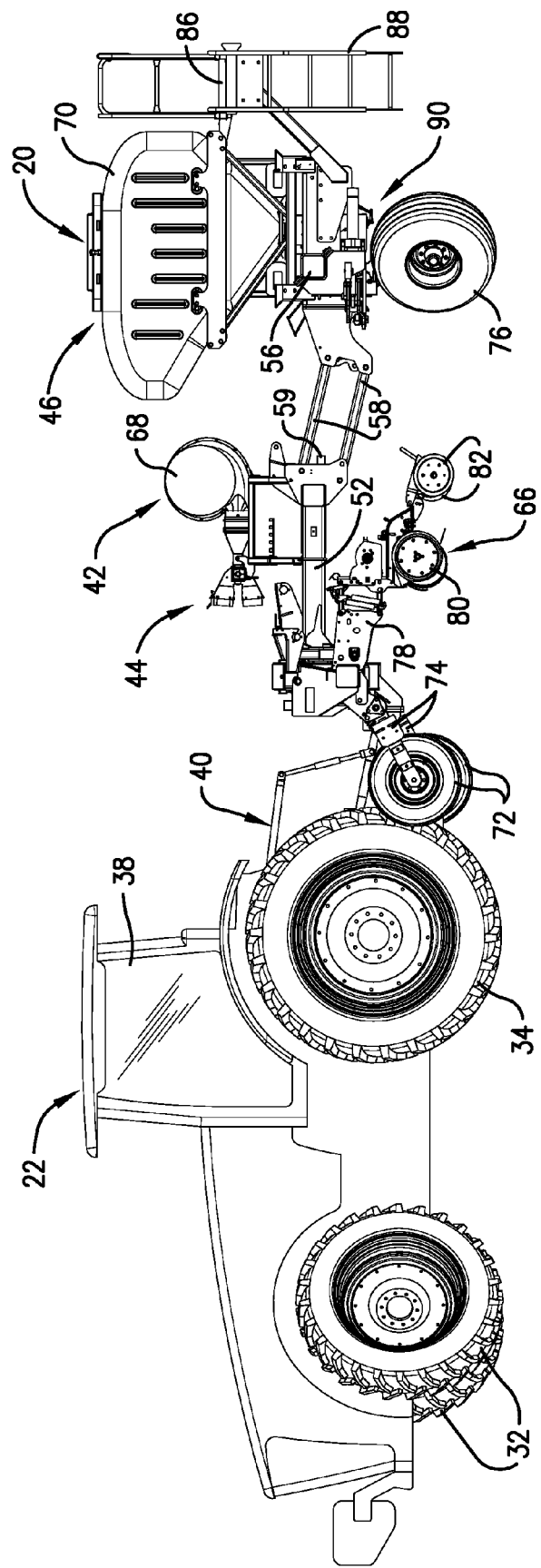
FIG. 3 is a left side elevated view of the implement-tractor combination illustrated in FIG. 1.

The implement 20 includes a frame assembly 42 having a movable-frame portion 44 and a fixed-frame portion 46. The movable-frame portion 44 is of a generally rectangular configuration and includes parallel front and rear bars 48, 50 with parallel side bars 52, 54. The fixed-frame portion 46 includes a lateral bar 56 that runs parallel to the front and rear bars 48, 50 of the movable-frame portion 44. The lateral bar 56 is secured to the rear bar 50 of the movable-frame portion 44 via two sets of hinged arms 58, 60 that permit a degree of movement between the movable-frame portion 44 and the fixed-frame portion 46. In this manner, the hitch 40 is operable to lift the movable-frame portion 44 from a down (use) configuration where the soil-engaging parts of the implement attached to the movable-frame portion 44 are in contact with the field 26, as illustrated in FIGS. 1 and 2, to a lifted, up (non-use) configuration where the soil-engaging parts of the implement attached to the movable-frame portion 44 are elevated from the field 26, as illustrated in FIG. 3. The soil-engaging parts of the implement attached to the fixed-frame portion 46 remain in contact with the field 26 regardless of whether the movable-frame portion 44 is in its use configuration or in its non-use configuration. As shown in FIG. 3, the implement 20 can be equipped with an implement position sensor/switch 59 for detecting whether the implement 20 is in the down (use) configuration or the up (non-use) configuration.

Extending laterally from either side of the front bar 48 of the movable-frame portion 44 are parallel, foldable arms 62, 64. The foldable arms 62, 64 are selectively configurable in a laterally-extended, use configuration, as depicted in FIGS. 1 and 2, and a vertically-folded, stored configuration (not illustrated).

The movable-frame portion 44 supports a plurality of seed planting row units 66 and a seed-delivery system 68. The fixed-frame portion 46 supports a bulk seed hopper 70. The movable-frame portion 44 is supported by the tractor 22 and a set of front wheels 72 that are each mounted to one of the foldable arms 62, 64 in a fixed position via a fork 74. At least a portion of the weight of the fixed-frame portion 46 and the bulk seed hopper 70 are supported by a set of steerable rear wheels 76. In the exemplary embodiment, each rear wheel 76 is a caster wheel mounted on either side of the lateral bar 56 of the implement 20 and positioned below the hopper 70.

The plurality of row units 66 are aligned adjacent to each other along the front bar 48 of the frame assembly 42 with the outermost row units 66 positioned along the foldable arms 62, 64. In the exemplary embodiment, the implement 20 has twelve row units 66 that are evenly spaced next to each other. It is foreseen, however, that the implement 20 may have any number of row units 66, for example, 2 to 48 row units 66, and preferably 12, 16, 24, or 32 row units 66, without deviating from the scope of the present inventive concept.

Each of the row units 66 includes a vertically-adjustable extension portion 78, a set of depth-gauge wheels 80, and a set of press wheels 82. The depth-gauge wheels 80 are operable to support the extension portion 78, which extends from either the front bar 48 or one of the foldable arms 62, 64. The extension portion 78 is operable to define a depth of the press wheels 82 relative to the depth-gauge wheels 80 and is adjustable.

Depending on an application of the implement-tractor combination 20, 22, the press wheels 82 may be set at varying depths to specify a depth for delivery of seed 28 to the field 26, for instance, at a depth equal to that of the depth-gauge wheels 80 so that the press wheels 82 are operable to deliver seed 28 on a surface of the field 26, or at a depth below the depth-gauge wheels 80 so that the press wheels 82 are operable to deliver seed 28 below the surface of the field 26. The depth-gauge wheels 80 and the press wheels 82 are fastened to the extension portion 78 via nuts and bolts (not illustrated).

The hopper 70 may have a seed 28 capacity of at least 40 bushels, at least 60 bushels, or at least 80 bushels. The hopper 70 is centrally mounted on the lateral bar 56 of the fixed-frame portion 46 directly over each rear wheel 76 of the implement 20 so that the rear wheels 76 support the weight of the seed 28 within the hopper 70. In exemplary embodiments, the rear wheels 76 are configured to support at least 50, 75, 95, or 100 percent of the weight of the seed 28 within the hopper 70. A hatch 84 is provided on a top of the hopper 70 to permit access to an inside of the hopper 70 by an operator of the implement-tractor combination 20, 22. Access to the hatch 84 is facilitated via an elevated walk board 86 that is mounted to the hopper 70 with a ladder 88 that depends therefrom.

The seed-delivery system 68 is secured to the rear bar 50 of the movable-frame portion 44 between the hopper 70 and the row units 66. The seed-delivery system 68 is operable to communicate seed 28 from the hopper 70 to each of the row units 66 for distribution to the field 26.

The front wheels 72 of the implement 20 are operable to engage and travel along the field 26 only when the foldable arms 62, 64 are in the laterally-extended, use configuration, as illustrated in FIG. 1. When the foldable arms 62, 64 are in the vertically-folded, stored configuration, the front wheels 72 are suspended above the field 26 (not illustrated).

Figure 5:
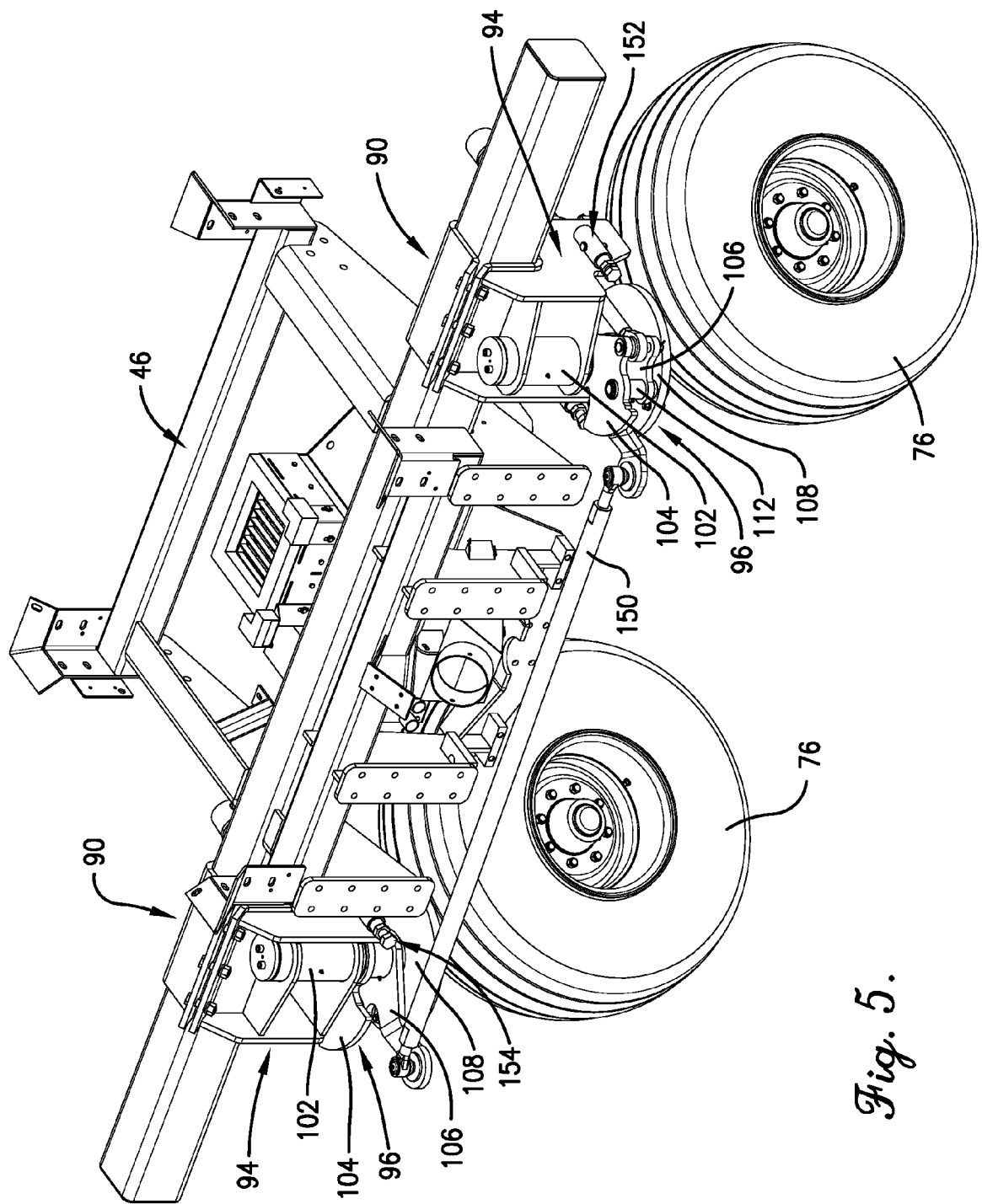
FIG. 5 is a front left side perspective view of two wheel-mounting assemblies fastened to a rear of the implement of the implement-tractor combination illustrated in FIG. 1.
Figure 6:
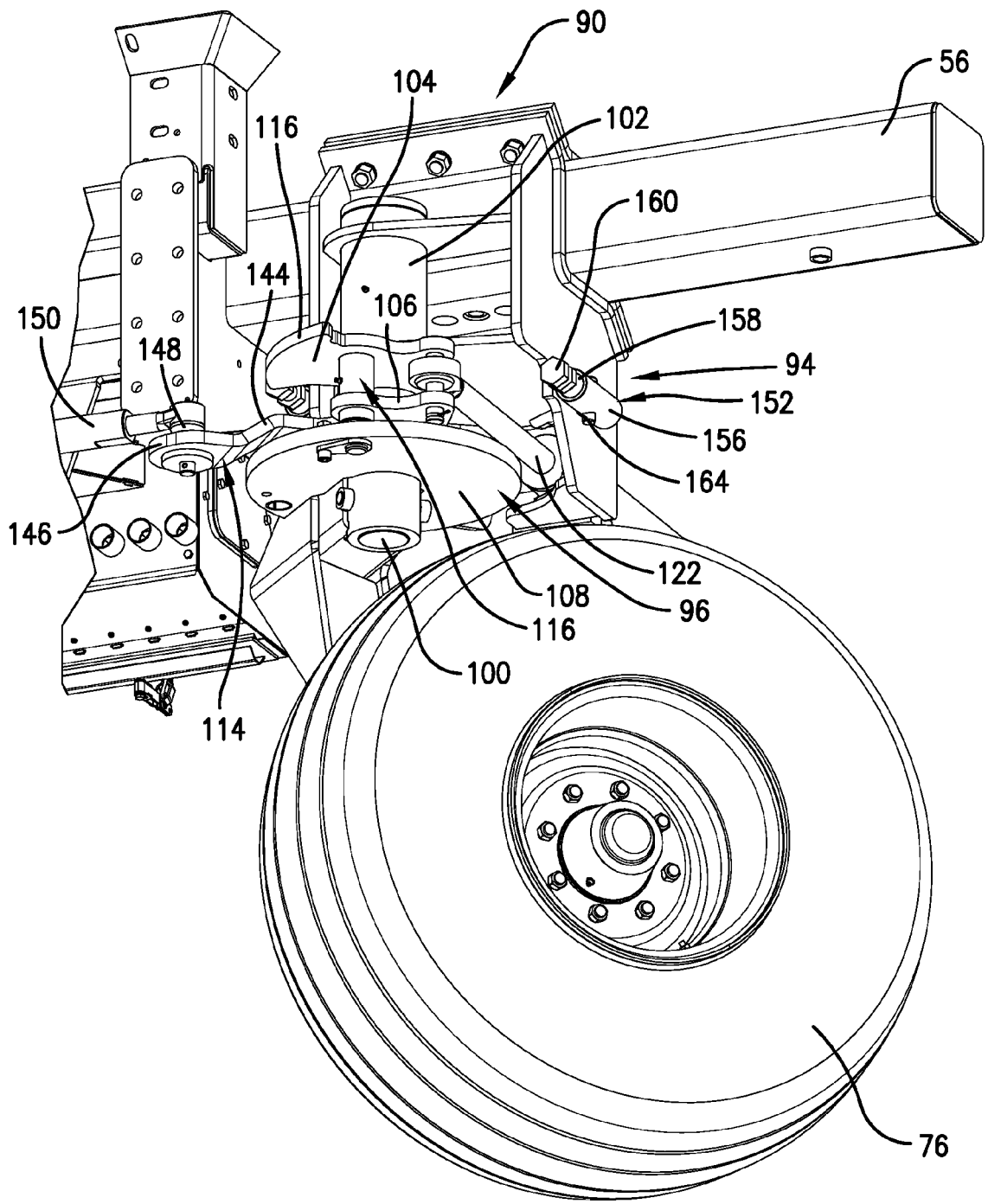
FIG. 6 is a front left side perspective view of a wheel-mounting assembly fastened to a rear of the implement of the implement-tractor combination illustrated in FIG. 1.
Figure 7:
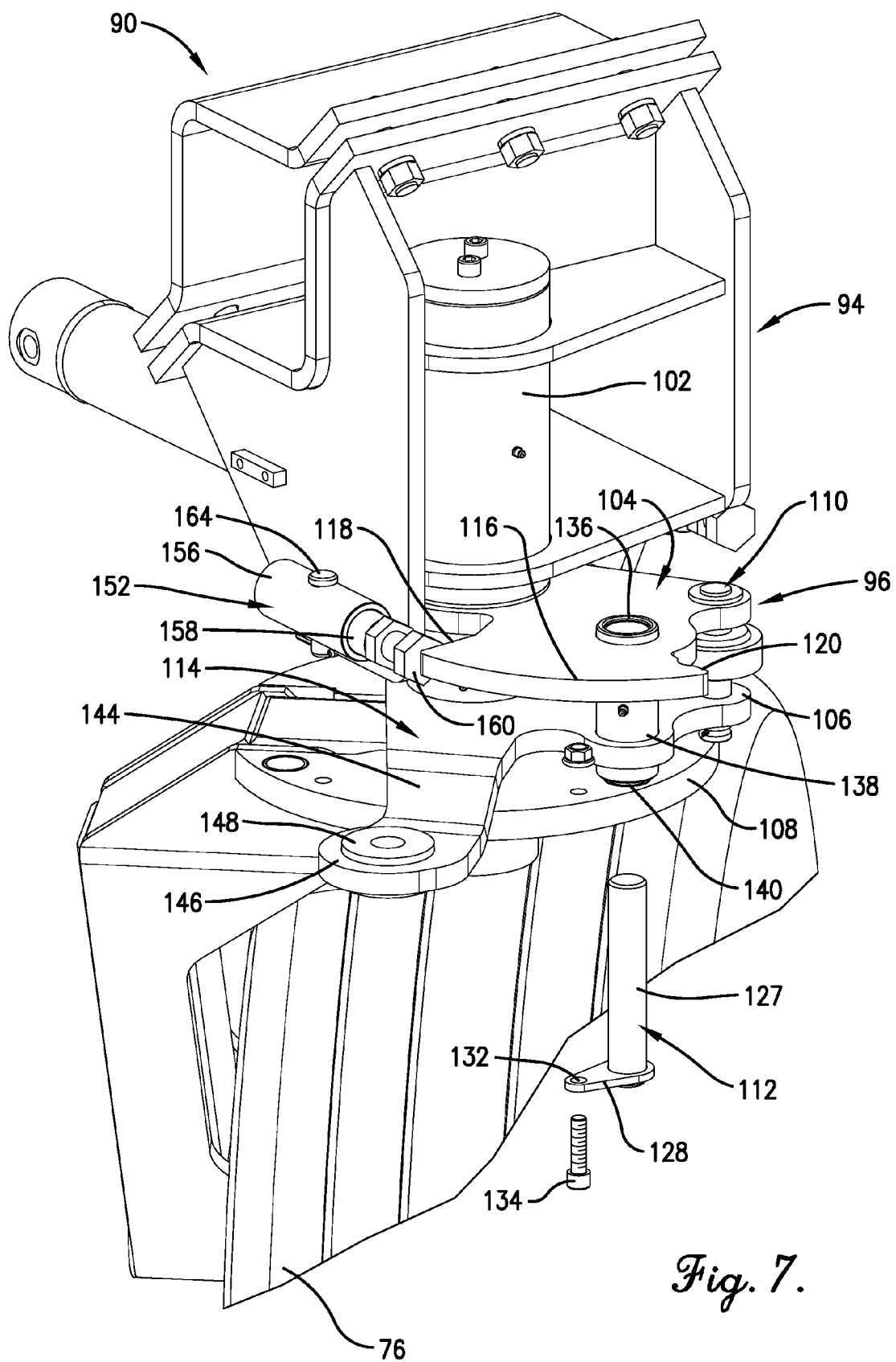
FIG. 7 is an enlarged front right side perspective view of the wheel-mounting assembly illustrated in FIG. 6.

Turning to FIGS. 5-7, each rear wheel 76 of the implement 20 is pivotably coupled to the lateral bar 56 of the fixed-frame portion 46 via a self-contained wheel mounting assembly 90. Each wheel mounting assembly 90 includes a fixed-upper portion 94 that is rigidly secured to the lateral bar 56 of the fixed frame portion 46 and a movable-lower portion 96 that is rotatably secured to the fixed-upper portion 94 at a vertical axis of rotation that is defined by a spindle 100 housed within a bushing 102. The spindle 100 and bushing 102 are operable to permit rotation of the movable-lower portion 96 relative to the fixed-upper portion 94 about a vertical axis or rotation. In the exemplary embodiment, each wheel assembly 90 operates wholly independently from each other.

The movable-lower portion 96 of the wheel mounting assembly 90 includes an upper member 104, a middle member 106, and a lower member 108 that are generally verticallyspaced, stacked, flat plates. The upper member 104 includes a controller-attachment assembly 110, a quick-release free-wheel mechanism 112, a depending attachment member 114, and a projection 116 with abutment surfaces 118, 120 on both sides thereof.

Secured to and between the upper and middle members 104, 106 via the controller-attachment assembly 110 is a hydraulic cylinder or linear steering actuator 122. The steering actuator 122 respectively couples the fixed-upper portion 94 to the movable-lower portion 96 via first and second ends of the steering actuator 122. The steering actuator 122 is operable to define a degree of rotation or pivot of the movable-lower portion 96 relative to the fixed-upper portion 94 by exerting a force on both the movable-lower portion 96 and the fixed-upper portion 94 without transferring the force to any element outside of the wheel assembly 90 (e.g., to the lateral bar 56). In this manner, the force is contained within the wheel assembly 90 and wear and tear on other elements (e.g., the lateral bar 56 of the implement 20) are reduced.

Figure 8:
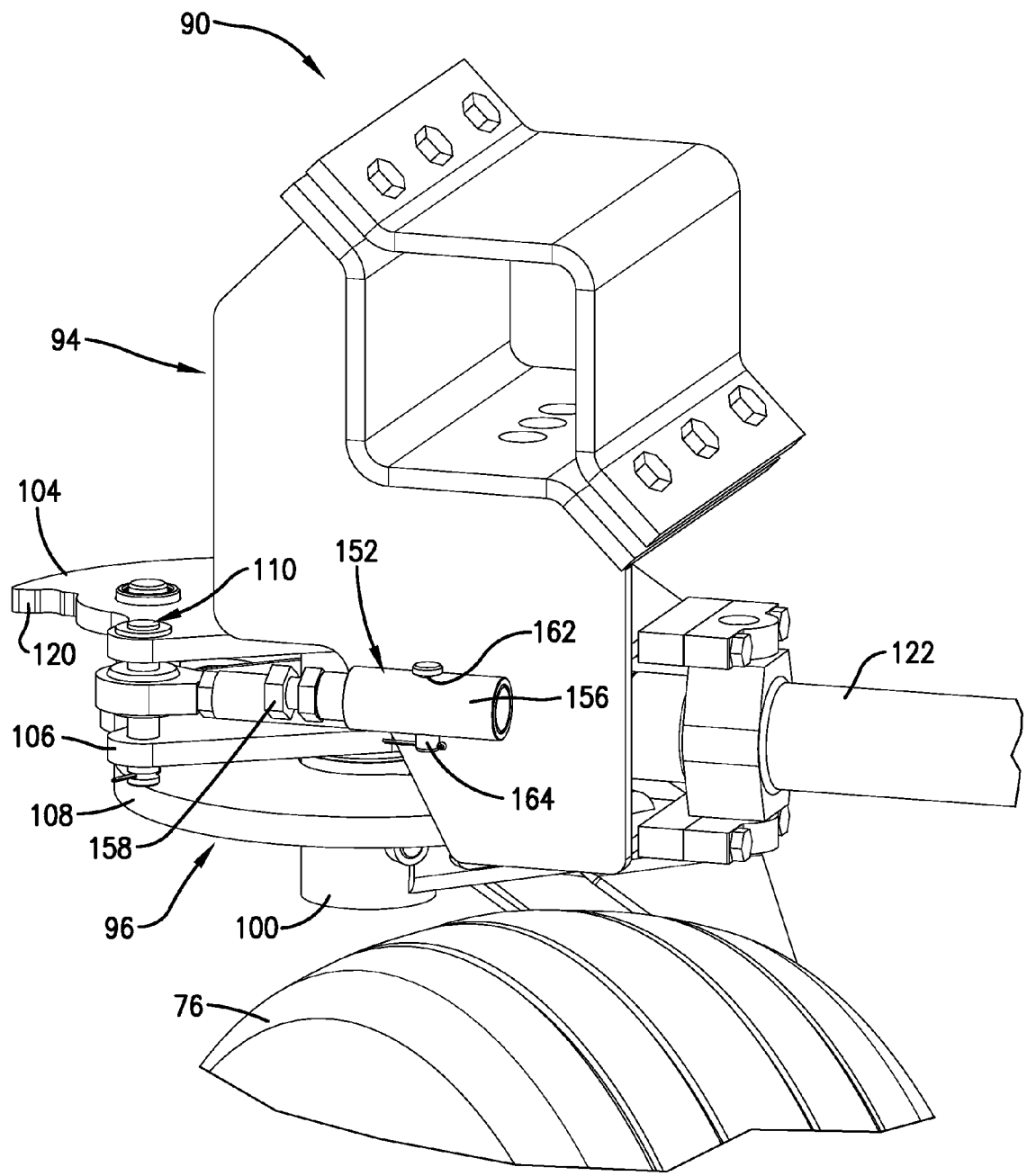
FIG. 8 is an enlarged rear left side perspective view of the wheel-mounting assembly illustrated in FIG. 6.
Figure 9:
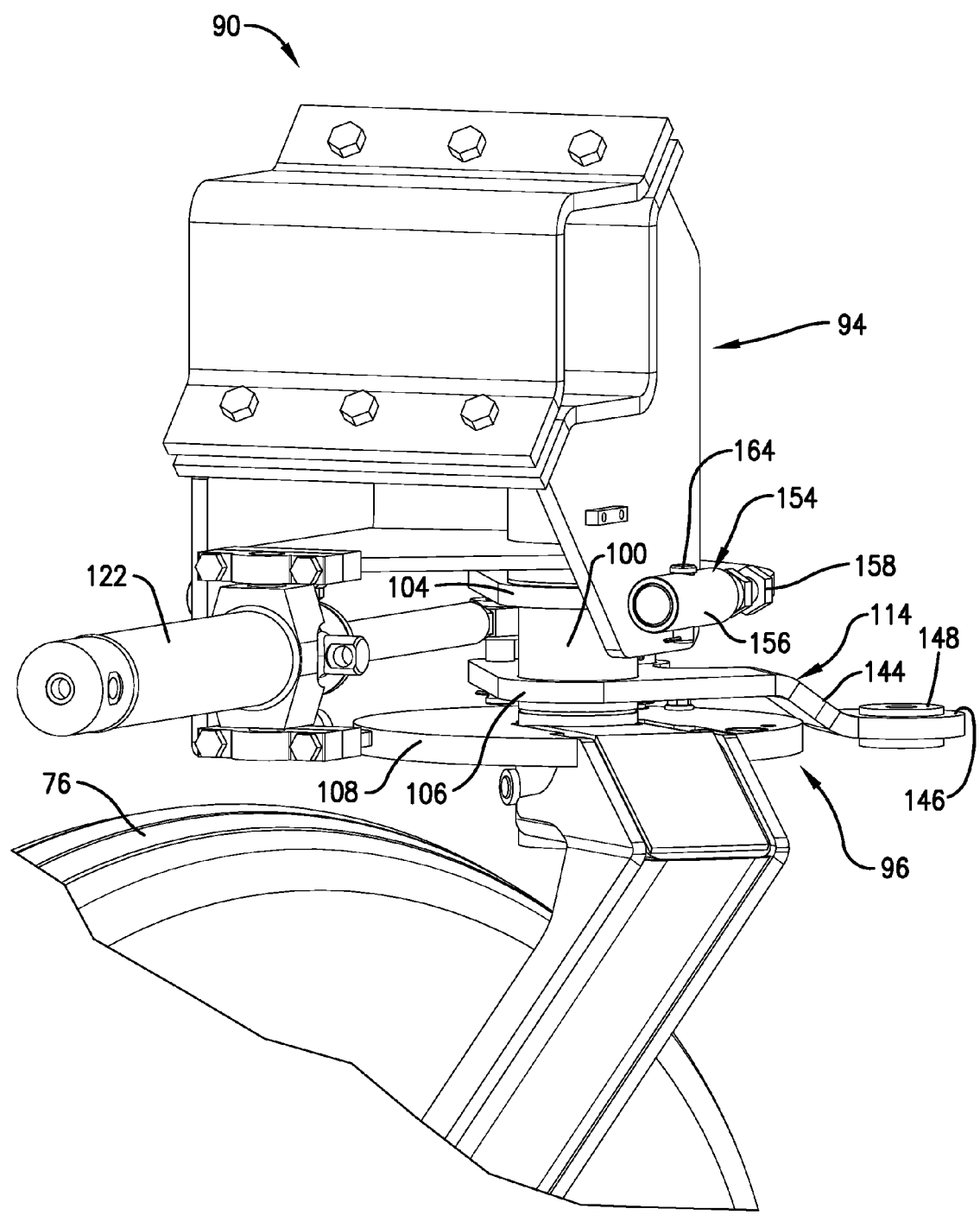
FIG. 9 is an enlarged rear right side perspective view of the wheel-mounting assembly illustrated in FIG. 6.

Each steering actuator 122 is operable to assume a degree of extension anywhere from a fully-extended configuration to a fully-retracted configuration. The degree of extension is determined by a programmable controller 123 (FIG. 10). When the steering actuator 122 is in the fully-extended configuration, the upper member 104 and the rear wheel 76 of the implement 20 are rotated away from the steering actuator 122, as illustrated in FIGS. 8 and 9. When the steering actuator 122 is in the fully-retracted configuration, the upper member 104 and the rear wheel 76 of the implement 20 are rotated toward the steering actuator 122.

The programmable controller 123 is configured for attachment in the cab 38 of the tractor 22 and is connected to a steering detector in the form of a data connector 124. The data connector 124 is configured for attachment to a controller area network data binary unit system (CAN bus) 125 of the tractor 22, as illustrated in FIG. 10. The CAN bus 125 transmits tractor steering data relating to the steering system 36 of the tractor 22. The tractor steering data transmitted by the CAN bus 125 can include a positional attribute of the tractor steering system 36. The positional attribute of the tractor steering data can indicate the angle at which the tractor 22 is currently being steered. The data connector 124 receives/detects the positional attribute of the tractor steering system 36 and transmits the positional attribute to the controller 123.

The controller 123 is configured to receive and process the positional attribute of the tractor steering system 36 and calculate and apply a force to each wheel assembly 90 via each steering actuator 122 based on the positional attribute. The force applied to each wheel assembly 90 causes the movable-lower portion 96 to rotate in a clockwise or counterclockwise direction so that each rear wheel 76 of the implement 20 pivots to an angle that is the same as but opposite to the angle of the front wheels 32 of the tractor 22. If the positional attribute indicates that the tractor has a straight heading, the controller 123 maintains each rear wheel 76 of the implement 20 parallel to the front wheels 32 of the tractor 22 so that the implement-tractor combination 20, 22 is operable to travel straight ahead. In this manner, each rear wheel 76 of the implement 20 is caused to assume the same, but opposite angle as the front wheels 32 of the tractor 22 when the tractor 22 is turning and each rear wheel 76 of the implement 20 is prevented from assuming an undesirable angle due to other forces (e.g., forces transmitted due to impact with foreign objects such as ruts in the field 26 and rocks).

Figure 4:
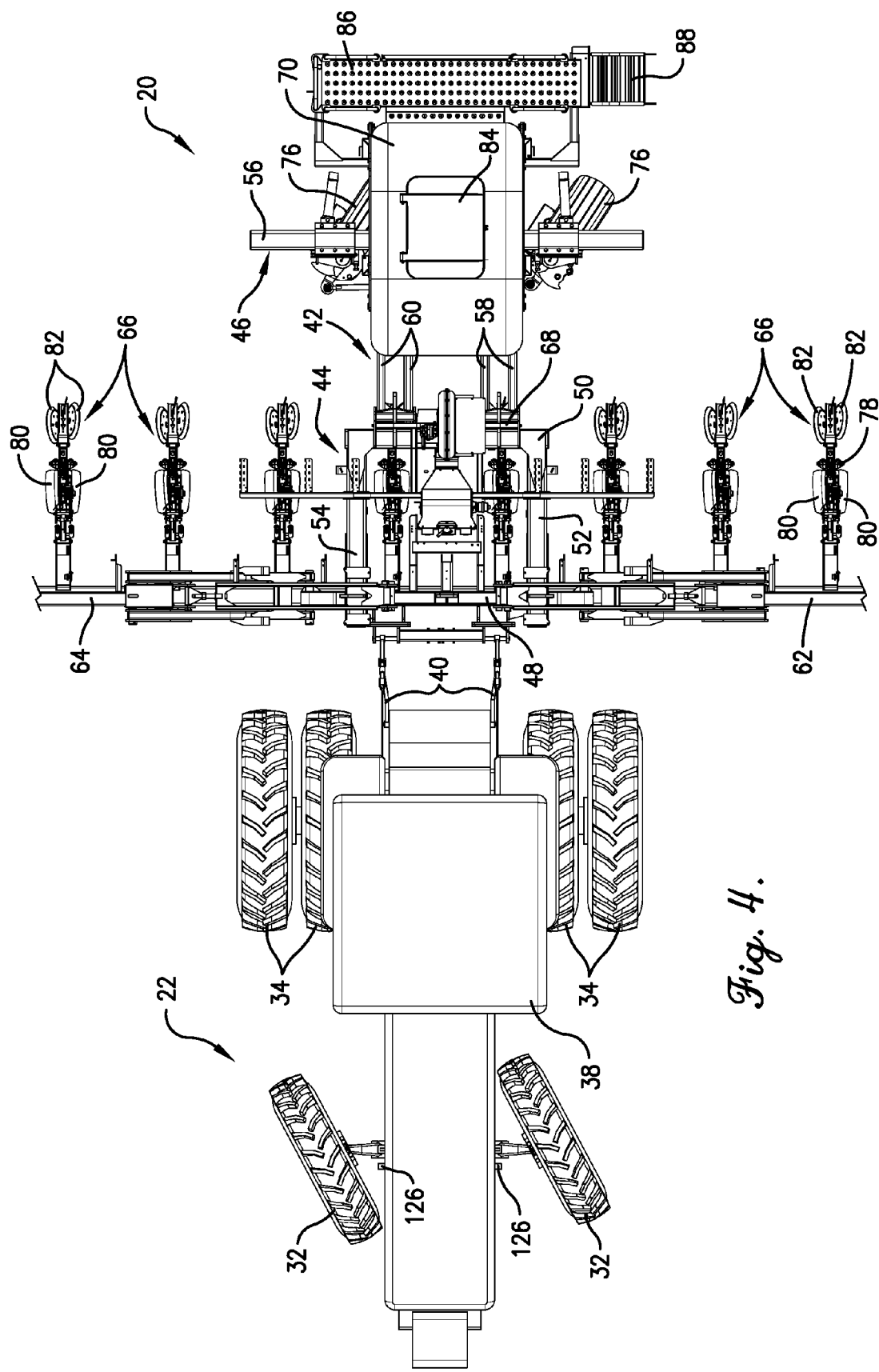
FIG. 4 is a top plan view of the implement-tractor combination illustrated in FIG. 1.

If the tractor 22 is not equipped with a CAN bus, the programmable controller 123 may be configured for attachment in the cab 38 of the tractor 22 and connected to a steering detector in the form of one or more position sensors 126 mounted near the wheels 32 of the tractor 22, as illustrated in FIGS. 1 and 4. The position sensors 126 may be configured to measure an orientation or angle (i.e., a positional attribute) of one or both front wheels 32 of the tractor 22 by measuring a position of a linear steering member of the tractor steering system (e.g., a tie rod or rack and pinion member). Additionally, or in the alternative, the position sensors 126 may be configured to measure a rotation speed of one front wheel 32 relative to the other front wheel 32.

As shown in FIG. 10, the controller 123 can include a steering mode switch 128 that is shiftable between an active position and a passive position. The steering mode switch 128 and the implement position sensor 59 (discussed above with reference to FIG. 3) cooperate to determine whether the steering system of the implement 20 operates in an active steering mode or a passive steering mode. In the active steering mode, the steering system of the implement 20 is engaged and actively steers the rear wheels 76 of the implement 20 during movement. In the passive steering mode, the steering system of the implement 20 is disengaged and the rear wheels 76 of the implement 20 are allowed to "float" (i.e., caster freely) during movement of the implement 20.

When the implement position sensor 59 indicates that the implement is in the down (use) configuration, the steering mode of the implement 20 is determined by the position of the steering mode switch 128. Thus, during use of the implement 20 to engage the soil in its down configuration, the operator of the tractor 22 can use the steering mode switch 128 to determine whether or not the implement 20 is operated in the active steering mode or the passive steering mode. However, when the implement position sensor 59 indicates that the implement is in the up (non-use) configuration, the implement 20 is automatically operated in the active steering mode, regardless of the position of the steering mode switch 128.

Referring again to FIG. 7, the free-wheel mechanism 112 includes a retractable pin 127 with an extension portion 128 depending from an end of the pin 127. The extension portion 128 has an aperture 132 to receive a locking pin 134 therethrough. The pin 127 is sized and shaped to be selectively engaged or disengaged through apertures 136, 138, 140 in the upper, middle, and lower members 104, 106, 108, respectively. In this manner, the pin 127 is operable to selectively secure the upper member and middle members 104, 106 to the lower member 108, so that the upper, middle, and lower members 104, 106, 108 rotate together. Thus, when the pin 127 is positioned within the apertures 136, 138, 140 in the upper, middle, and lower members 104, 106, 108, the pin 127 is operable to secure the movable-lower portion 96 to the fixed-upper portion 94 so that the steering actuator 122 is operable to control a pivot of each rear wheel 76 of the implement 20. The locking pin 134 is sized and shaped to be received by an aperture 142 in the lower member 108, and is operable to secure the pin 127 in the upper, middle, and lower members 104, 106, 108. When the pin 127 is removed from the apertures 136, 138, 140, the lower member 108 of the movable-lower portion 96 is operable to rotate independently from the fixed-upper portion 94 and movement of the steering actuator 122 has no affect on the rear wheel 76 of the implement 20 (i.e., the rear wheel 76 operates in a "free-wheel" mode and is capable of freely rotating or pivoting independent of the steering actuator 122).

Because each wheel assembly 90 operates independently from the other, one or both rear wheels 76 of the implement 20 may be in the free-wheel mode. When one or both rear wheels 76 of the implement 20 is in the free-wheel mode, the rear wheel 76 in the free-wheel mode operates as a traditional caster wheel and is subject to influence from various forces including but not limited to pull-force from the tractor 22 due to its direction of travel and other forces (e.g., forces transmitted due to impact with foreign objects such as ruts in the field 26 and rocks).

The depending attachment member 114 has a downwardly-extending portion 144 and a horizontally-extending portion 146 from which a platform 148 is affixed. Secured to the platform 148 is a tie rod 150 that connects each wheel assembly 90, as illustrated in FIGS. 5 and 6. The tie rod 150 is operable to ensure that each rear wheel 76 of the implement 20 is maintained at angles parallel to each other and does not assume an undesired configuration (e.g., perpendicular to a direction of travel of the implement-tractor combination 20, 22). Because the tie rod 150 is secured to the steering actuator 122 via the middle member 106, if the free-wheel mechanism 112 is removed and each rear wheel 76 of the implement 20 is in the free-wheel mode, then the tie rod 150 has no affect on each rear wheel 76. It is foreseen, however, that the middle member 106 and the lower member 106 may be secured to each other and not the upper member 104 to permit the tie rod 150 to affect each rear wheel 76 in the free-wheel mode without deviating from the scope of the present inventive concept.

The projection 116 of the upper member 104 extends toward a front of the implement 20 with the abutment surfaces 118, 120 on either side thereof. The projection 116 is configured to abut outer and inner abutment stop mechanisms 152, 154 that are affixed to either side of the movable-lower portion 96 of the wheel mounting assembly 90. The outer and inner abutment stop mechanisms 152, 154 define maximum degree of rotation points of the movable-lower portion 96 to limit a degree of pivoting of each rear wheel 76 within a defined range (e.g., 90, 135, or 180 degrees). The outer and inner abutment stop mechanisms 152, 154 each include an anchor 156 and a removable pin 158 with an abutment surface 160 at an end thereof. The anchor 156 is affixed to the movable-lower portion 96 (e.g., via welding) and has an aperture 162 to partially receive the removable pin 158 therein.

The abutment surface 160 is spaced from the anchor 156 by a length of the removable pin 158 at one of a plurality of distances to enable the operator to selectively adjust the defined range, that is, the maximum degree of rotation points of the movable-lower portion 96. In the exemplary embodiment, the removable pin 158 is selected from a plurality of removable pins (not illustrated) each of a different length. Each removable pin is sized and shaped to be slidably received by the anchor 156 and secured thereto via a locking pin 164.

In this manner, as the upper member 104 rotates, the abutment surfaces 118, 120 of the projection 116 abut one of the outer and inner abutment stop mechanisms 152, 154 and the rear wheel 76 of the implement 20 is prevented from rotating past the maximum degree of rotation points and each rear wheel 76 of the implement 20 are prevented from assuming an undesirable configuration (e.g., perpendicular to a direction of travel of the implement-tractor combination 20, 22 or an angle that exceeds the turning radius of the tractor 22). Additionally, the outer and inner abutment stop mechanisms 152, 154 relieve the steering actuator 122 during sharp turns of the implement-tractor combination 20, 22 by absorbing force. Any force absorbed by the outer and inner abutment stop mechanisms 152, 154 is only transmitted to the wheel assembly 90 and not transmitted to any elements outside of the wheel assembly 90 (e.g., the frame assembly 42).

It is foreseen, that the removable pin 158 may be a threaded member having an external thread that is sized and shaped to mate with a corresponding internal thread of the anchor 156 so that the defined range, that is, the maximum degree of rotation points, may be adjusted via clockwise or counter-clockwise rotation of the threaded bolt relative to the threaded anchor. In this manner, only a single removable pin 158 is required and the locking pin 164 may be eliminated.

The present inventive concept can be further illustrated by the following example of an embodiment thereof, although it will be understood that this example is included merely for the purposes of illustration and is not intended to limit the scope of the present inventive concept.

Figure 11:
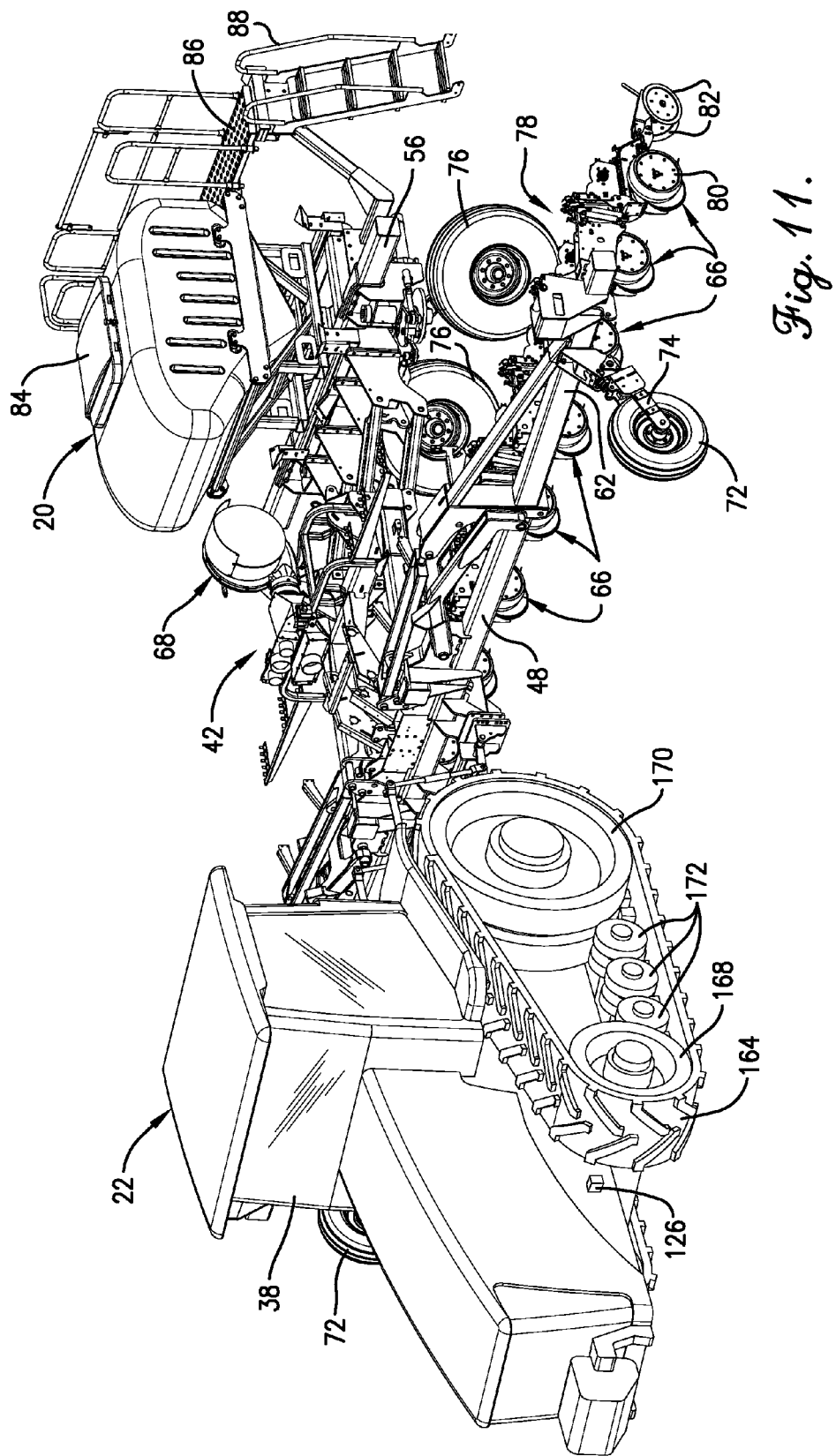
FIG. 11 is a front left side perspective view of an implement-tractor combination utilizing a tractor-reactive steering implement, where the tractor is a tracked tractor.

In another embodiment depicted in FIG. 11, the tractor 22 is a tracked tractor having a continuous track 164 with front, rear, and middle drive/guide wheels 168, 170, 172. If the tracked tractor 22 of FIG. 11 is equipped with a CAN bus, a positional attribute of the steering system can be read directly from the CAN bus, as previously described. If the tracked tractor 22 of FIG. 11, does not have a CAN bus, a positional attribute of the steering system can be obtained by sensors that detect the relative rotational speed to the tracks 164 or the drive/guide wheels 168, 170, 172. For instance, if the right track 164 or right wheels 168, 170, 172 have a higher rotational speed than the corresponding left track 164 or left wheels 168, 170, 172, the steering detector can sense the difference and the steering controller can deduce that the tractor 22 is turning left at a specific angle (thus, detecting a positional attribute of the tractor steering system). The steering controller can then process the positional attribute as described previously.

In use, the implement-tractor combination 20, 22 and the controller 123 is activated and the movable-frame portion 44 is raised to the non-use configuration, as illustrated by FIG. 3. The implement-tractor combination 20, 22 is then maneuvered to a start position in the field 26. When the implement-tractor combination 20, 22 is in the start position, the movable-frame portion 44 is lowered to the use configuration, as illustrated by FIGS. 1 and 2, and the press wheels 82 are set at a desired depth via adjustment of depth-gauge wheels 80 so that the press wheels 82 are operable to deliver seed 28 at the desired depth in the field 26. The seed-delivery system 68 is then activated and the implement-tractor combination 20, 22 begins to traverse the field 26.

As the implement-tractor combination 20, 22 traverses the field 26, the steering detector in the form of the data connector 124 or the position sensors 126 continuously monitors the positional attribute of the tractor 22 that relates to the direction of travel of the tractor 22 and continuously transmits the positional attribute to the controller 123 when the implement-tractor combination 20, 22 is in motion (e.g., forward, backward, rightward, and leftward). Upon receipt of the positional attribute of the tractor steering system 36, the controller 123 processes the positional attribute and calculates and communicates a force to be applied to each wheel assembly 90 via each steering actuator 122 based on the positional attribute and any changes to the positional attribute. As previously discussed, the force applied to each wheel assembly 90 causes the movable-lower portion 96 to rotate in a clockwise or counterclockwise direction so that each rear wheel 76 of the implement 20 pivots to an angle that is the same as but opposite to the angle of the front wheels 32 of the tractor 22.

In most applications, it is desirable to maintain the controller 123 in an activated position so that each rear wheel 76 of the implement 20 is continuously controlled to reflect a same, but opposite angle of the front wheels 32 of the tractor 22. In this manner, maneuverability and control of the implement-tractor combination 20, 22 are enhanced relative to conventional equipment and the implement-tractor combination 20, 22 may traverse the field 26, in forward and in reverse, without disrupting the field 26 via the creation of divots or the like. Should the steerable agricultural implement 20 malfunction during use, one or both rear wheels 76 of the implement 20 may be disengaged from each steering actuator 122 via removal of the free-wheel mechanism 112 to permit each rear wheel 76 to operate in the free-wheel mode.

Various embodiments of the present inventive concept can be embodied as computer readable codes on a computer readable recording medium. The computer readable recording medium may include any data storage device suitable to store data that can be read by a computer system. A non-exhaustive list of possible examples of computer readable recording mediums include read-only memory (ROM), random-access memory (RAM), CD-ROMS, magnetic tapes, floppy disks, optical storage devices, and carrier waves, such as data transmission via the internet. The computer readable recording medium may also be distributed over network-coupled computer systems so that the computer readable code is stored and executed in a distribution fashion. Various embodiments of the present inventive concept may also be embodied in hardware, software or in a combination of hardware and software. For example, the controller 123 and/or functions thereof may be embodied in software, in hardware or in a combination thereof. In various embodiments, the controller 123 and/or functions thereof may be embodied as computer readable codes on a computer readable recording medium to perform tasks such as processing and calculating operations, such as processing the tractor steering data and calculating an appropriate force to apply to each wheel assembly 90.

The preferred forms of the invention described above are to be used as illustration only, and should not be used in a limiting sense to interpret the scope of the present inventive concept. Modifications to the exemplary embodiments, set forth above, could be readily made by those skilled in the art without departing from the spirit of the present inventive concept.

The inventors hereby state their intent to rely on the Doctrine of Equivalents to determine and assess the reasonably fair scope of the present inventive concept as it pertains to any apparatus not materially departing from but outside the literal scope of the invention as set forth in the following claims.

What is claimed is:

1. A steerable agricultural implement having a configuration that adapts the implement to be coupled to a tractor by a multi-point hitch system that restrains side-to-side articulation between said tractor and said implement, said implement comprising:
   a frame;
   a plurality of steerable wheels pivotably coupled to said frame and operable to support at least a portion of the weight of said implement; and
   an implement steering system for steering said wheels in response to the steering system of said tractor, said implement steering system comprising—
      a plurality of self-contained wheel mounting assemblies for pivotably coupling said wheels to said frame, wherein each of said wheel mounting assemblies comprises a fixed portion attached to and stationary relative to said frame and a movable portion attached to and movable with at least one of said wheels during pivoting of the wheel relative to said frame,
      each of said wheel mounting assemblies further comprising a steering actuator coupled between said fixed portion and said movable portion of the wheel mounting assembly and configured to pivot said movable portion and the wheel relative to said fixed portion,
      a tractor steering detector configured for attachment to said tractor and operable to detect a positional attribute of the tractor steering system, and
      a controller for controlling said steering actuators based on said positional attribute of the tractor steering system.

2. The implement of claim 1, wherein said steering actuators do not transmit force from said movable portion to said frame.

3. The implement of claim 1, wherein each of said steering actuators comprises a linear actuator having a first end coupled to said fixed portion and a second end coupled to said movable portion.

4. The implement of claim 3, wherein said linear actuator is a hydraulic cylinder.

5. The implement of claim 1, wherein said tractor comprises a controller area network data binary unit system (CAN bus), wherein said tractor steering detector is a data connector configured for connection to said CAN bus and for receipt of said positional attribute from said CAN bus.

6. The implement of claim 1, wherein said tractor comprises a front wheel steering system, wherein said tractor steering detector is a position sensor configured to detect the degree of movement of said front wheel steering system.

7. The implement of claim 1, wherein said fixed portion of each of said wheel mounting assemblies comprises an adjustable stop mechanism for limiting the degree of pivoting of said wheels within a defined range.

8. The implement of claim 1, wherein each of said wheels comprises a caster wheel, wherein each of said wheel mounting assemblies comprises a quick-release free-wheel mechanism for selectively permitting said caster wheels to be castered independent of said steering actuator.

9. The implement of claim 8, wherein said movable portion comprises a first section connected to said steering actuator for receiving steering force from said actuator and a second section connected to said caster wheel for movement with the caster wheel, said quick-release mechanism being configured for releasably interconnecting said first and second sections in mutual force-transmitting relationship such that when said sections are mutually interconnected, steering force from said steering actuator is transmitted from said first section to said second section and the caster wheel, and when said sections are released from mutual interconnection said second section and the caster wheel are free to caster independent of steering force from said steering actuator and said first section.

10. The implement of claim 9, wherein said quick release mechanism comprises a removable pin extending between said sections.

11. The implement of claim 9, wherein said first sections of a pair of said wheel assemblies are interconnected by a rigid link.

12. The implement of claim 9, wherein each of said wheel assemblies further comprises a pair of stops mounted on said fixed portion and positioned to engage and limit travel of said first section at opposite ends of the path of travel of said first section.

13. The implement of claim 1, wherein said implement is a planter comprising a plurality of seed planting row units and a bulk seed hopper, wherein said wheels are configured to support at least a portion of the weight of said bulk seed hopper.

14. The implement of claim 13, wherein the internal volume of said bulk seed hopper is at least 40 bushels, wherein said wheels are configured to support at least 50 percent of the weight of the seed within said bulk seed hopper.

15. The implement of claim 1, wherein said controller is programmed to cause said wheels to be turned during steering through a steering angle that is approximately equal to but opposite from the steering angle of the tractor.

16. The implement of claim 1, wherein said movable portions of a pair of said wheel assemblies are interconnected by a rigid link.

* * * * *